United States Patent
Luce

(10) Patent No.: US 10,974,819 B2
(45) Date of Patent: Apr. 13, 2021

(54) LATCH ASSEMBLY FOR SHOCK STRUT

(71) Applicant: GOODRICH CORPORATION, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 272 days.

(21) Appl. No.: 16/171,048

(22) Filed: Oct. 25, 2018

(65) Prior Publication Data

US 2019/0185147 A1   Jun. 20, 2019

Related U.S. Application Data

(60) Provisional application No. 62/599,453, filed on Dec. 15, 2017.

(51) Int. Cl.
| | |
|---|---|
| *B64C 25/26* | (2006.01) |
| *B64C 25/60* | (2006.01) |
| *F16F 9/56* | (2006.01) |
| *B64C 25/00* | (2006.01) |

(52) U.S. Cl.
CPC .............. *B64C 25/26* (2013.01); *B64C 25/60* (2013.01); *F16F 9/56* (2013.01); *B64C 2025/008* (2013.01); *F16F 2230/0041* (2013.01)

(58) Field of Classification Search
CPC ... B64C 2025/008; B64C 25/26; B64C 25/60; F16F 2230/0041; F16F 9/56
USPC .................................................. 244/102 SL
See application file for complete search history.

(56) References Cited

U.S. PATENT DOCUMENTS

| | | | |
|---|---|---|---|
| 2,621,004 A | 12/1952 | Ashton et al. | |
| 2,643,834 A | 6/1953 | Watman | |
| 5,310,140 A | 5/1994 | Veaux et al. | |
| 6,811,118 B2 | 11/2004 | Collet et al. | |
| 7,883,125 B2 | 2/2011 | Smith, III | |
| 2010/0140394 A1 | 6/2010 | Brookfield | |
| 2011/0198441 A1 | 8/2011 | Dubuisson et al. | |
| 2012/0056035 A1* | 3/2012 | Luce | B64C 25/26 244/102 SL |
| 2018/0208298 A1* | 7/2018 | Cottet | B64C 25/20 |
| 2018/0265185 A1* | 9/2018 | Parente | B64C 25/34 |
| 2019/0039723 A1* | 2/2019 | Dubrovsky | F16F 9/3207 |

FOREIGN PATENT DOCUMENTS

| | | |
|---|---|---|
| GB | 543609 | 3/1942 |
| GB | 1216732 | 12/1970 |

OTHER PUBLICATIONS

European Patent Office, European Search Report dated Apr. 25, 2019 in application No. 18212681.3.

* cited by examiner

*Primary Examiner* — Claude J Brown
(74) *Attorney, Agent, or Firm* — Snell & Wilmer L.L.P.

(57) ABSTRACT

A latch assembly for a shock strut may comprise a first linkage coupled to a strut cylinder and a shrink piston of the shock strut. A second linkage may be coupled to the strut cylinder. The second linkage may be configured to rotate the first linkage in response to the shock strut translating between a landing gear up position and a landing gear down position.

18 Claims, 7 Drawing Sheets

LATCH ASSEMBLY FOR SHOCK STRUT

CROSS REFERENCE TO RELATED APPLICATIONS

This application claims priority to, and the benefit of, U.S. Provisional Application Ser. No. 62/599,453, titled "LATCH ASSEMBLY FOR SHOCK STRUT," filed Dec. 15, 2017, which is incorporated in its entirety herein for all purposes by reference.

FIELD

The present disclosure relates to landing gear, and more particularly, to latch assemblies for shock struts.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff. Struts may be retracted, or shrunk, to fit the landing gear within a wheel well. A safety latch may be employed to prevent the strut from unshrinking while the landing gear is in the wheel well. Some safety latches can jam and/or inadvertently hold the strut in the shrunk position, even after the landing gear translates to the down position (i.e., exits the wheel well).

SUMMARY

A latch assembly for a shock strut is provided herein. In accordance with various embodiments, the latch assembly may comprise a first linkage coupled to a strut cylinder and to a shrink piston of the shock strut, and a second linkage coupled to the strut cylinder. The first linkage may comprise a tang. The second linkage may comprise a clevis configured to engage the tang. The second linkage may be configured to rotate the clevis in response to the shock strut translating between a landing gear up position and a landing gear down position. The clevis may be configured to block the first linkage from being in an in-line position.

In various embodiments, the clevis may be configured to rotate in a first direction and translate the tang away from the strut cylinder. The tang may be configured such that translation of the tang away from the strut cylinder translates the first linkage to an under-center position. The clevis may be further configured to rotate in a second direction opposite the first direction and translate the tang toward the strut cylinder. The tang may be configured such that translation of the tang toward the strut cylinder translates the first linkage to an over-center position.

In various embodiments, the clevis may comprise an inboard lug proximate the strut cylinder and an outboard lug distal the strut cylinder. The outboard lug may be configured to limit a translation of the tang when the latch assembly is in a locked position. The inboard lug may be configured to limit a translation of the tang toward the strut cylinder when the latch assembly is in an unlocked position.

In various embodiments, the clevis may be configured such that, as the shock strut moves from the landing gear up position to the landing gear down position, the clevis engages the tang and translates the first linkage from an over-center position to an under-center position. The clevis may be configured such that, as the shock strut moves from the landing gear down position to the landing gear up position, the clevis engages the tang and translates the first linkage from the under-center position to the over-center position.

A shock strut is also disclosed herein. In accordance with various embodiments, the shock strut may comprise a strut cylinder configured to rotate about a pivot joint, a shrink piston operatively coupled to the strut cylinder, and a latch assembly configured to regulate translation of the shrink piston. The latch assembly may comprise a first linkage coupled to the shrink piston, and a second linkage configured to manipulate the first linkage. The second linkage may be configured to rotate the first linkage in response to a rotation of the strut cylinder about the pivot joint. The second linkage may be configured to block the first linkage from being in an in-line position.

In various embodiments, the first linkage may comprise a tang, and the second linkage may comprise a clevis. The clevis may be configured such that, as the shock strut translates from a landing gear up position to a landing gear down position, the clevis engages the tang and translates the first linkage from an over-center position to an under-center position. The clevis may be configured such that, as the shock strut translates from the landing gear down position to the landing gear up position, the clevis engages the tang and translates the first linkage from the under-center position to the over-center position.

In various embodiments, the first linkage may be configured such that, in the over-center position, the shrink piston is prevented from translating away from the strut cylinder. In various embodiments, the first linkage and the second linkage may be configured such that, when the first linkage is in the under-center position, an inboard lug of the clevis prevents the first linkage from translating to the in-line position.

In various embodiments, at least one of the first linkage or the second linkage may comprise a clevis. The clevis may be configured to rotate in a first direction and translate the first linkage to an under-center position. The shrink piston may be able to unshrink when the first linkage is in the under-center position. In various embodiments, the clevis may be configured to rotate in a second direction opposite the first direction and translate the first linkage to an over-center position. The shrink piston may be prevented from unshrinking when the first linkage is in the over-center position.

A shock strut is also disclosed herein. In accordance with various embodiments, the shock strut may comprise a strut cylinder, a shrink piston operatively coupled to the strut cylinder, and a latch assembly configured to regulate translation of the shrink piston relative to the strut cylinder. The latch assembly may comprise a first linkage coupled to the strut cylinder and the shrink piston, and a second linkage coupled to the strut cylinder. The second linkage may be configured to translate the first linkage between an over-center position and an under-center position as the shock strut rotates between a landing gear up position and a landing gear down position.

In various embodiments, the first linkage may comprise a tang and the second linkage may comprise a clevis. The second linkage may be configured to rotate the clevis in response to a rotation of the strut cylinder.

In various embodiments, the second linkage may be configured to rotate the clevis in a first direction and translate the tang away from the strut cylinder. The clevis and the tang may be configured such that rotation of the clevis in the first direction forces the first linkage into the under-center position.

In various embodiments, the second linkage may be configured to rotate the clevis in a second direction opposite the first direction and translate the tang toward the strut cylinder. The clevis and the tang may be configured such that rotation of the clevis in the second direction forces the first linkage into the over-center position. In various embodiments, when the first linkage is in the over-center position the shrink piston may be prevented from translating away from the strut cylinder.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
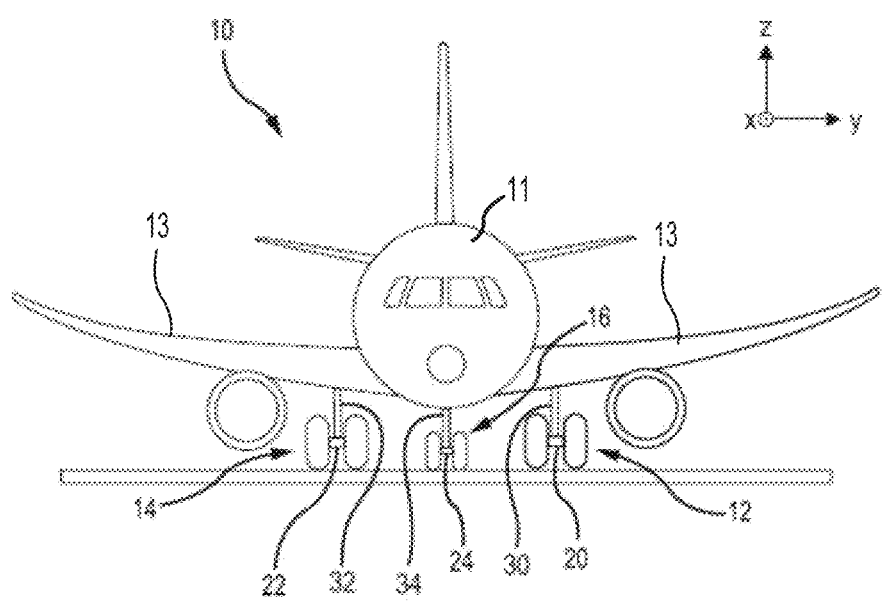
FIG. 1 illustrates an aircraft having landing gear in a landing gear down position, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily repeated herein for the sake of clarity. As used herein, "distal" refers to a direction outward, or generally, away from a reference component. As used herein, "proximate" refers to a direction toward, or generally, closer to the reference component.

With reference to FIG. 1, an aircraft 10 is illustrated, in accordance with various embodiments. Aircraft 10 may include a fuselage 11 and wings 13. Aircraft 10 may further include landing gear such as landing gear 12, landing gear 14, and landing gear 16. Landing gear 12, landing gear 14, and landing gear 16 may generally support aircraft 10, when aircraft is not flying, and allow aircraft 10 to taxi, take off, and land without damage. Landing gear 12 may include shock strut 30 and wheel assembly 20. Landing gear 14 may include shock strut 32 and wheel assembly 22. Landing gear 16 may include shock strut 34 and nose wheel assembly 24.

During flight, the shock struts (e.g., shock struts 30, 32, and 34) may be located within one or more wheel wells of aircraft 10. One or more of the shock struts 30, 32, and/or 34 may be shrunk prior to translating into their respective wheel well. Shock struts 30, 32, and/or 34 may utilize an available power source that exists on most aircraft (e.g., a pressurized hydraulic fluid supply) to effectively shrink the struts for retraction into the wheel wells. It may be desirable to prevent the shock struts from unshrinking while the landing gear is located within the wheel wells. In this regard, shock struts of the present disclosure, in accordance various embodiments, may include a latch assembly configured to prevent the shock struts from unshrinking while the landing gear is in an "up" position (i.e., while landing gear is located within the wheel well). The latch assembly may also be configured to reduce and/or prevent occurrences of the latch assembly "jamming" and thereby preventing the shock struts from unshrinking, when the landing gear is in a "down" position (i.e., when landing gear is located outside the wheel well, for example, during taxing, take off, and landing).

Figure 2A:
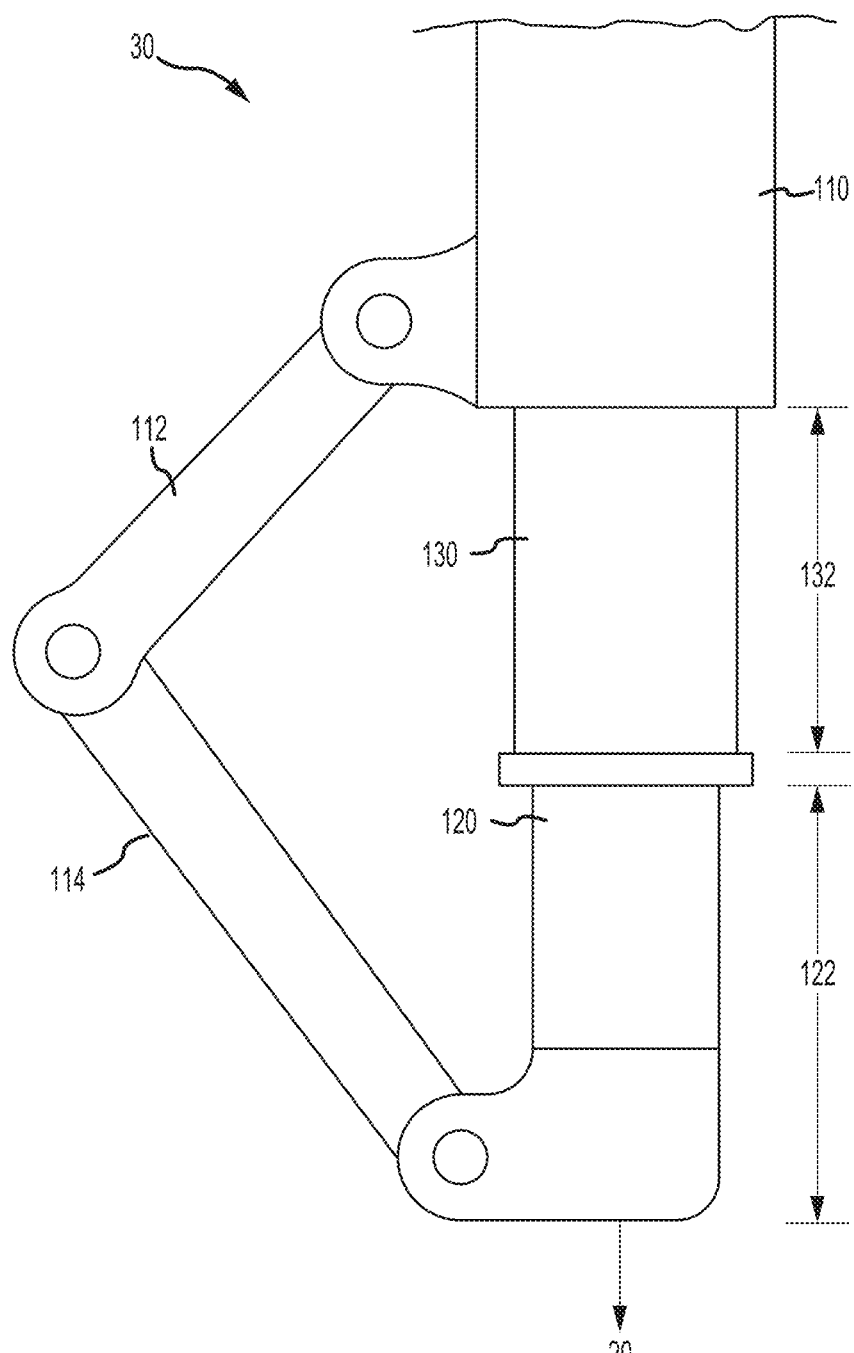
FIG. 2A illustrates a shock strut in a fully unshrunk position, in accordance with various embodiments.

With reference to FIG. 2A, shock strut 30 is illustrated in a fully unshrunk position, in accordance with various embodiments. While FIGS. 2A, 2B, 3A, 3B, 3C, and 3D illustrate shock strut 30, it should be understood that shock struts 32 and 34 may include the elements and functionalities as described herein with respect to shock strut 30. Shock strut 30 may comprise a strut cylinder 110, a strut piston actuator (strut piston) 120, and a shrink piston 130. Strut piston 120 may be operatively coupled to strut cylinder 110 and shrink piston 130. Shrink piston 130 may be operatively coupled to strut cylinder 110. Strut cylinder 110 may be configured to receive shrink piston 130 in a manner that allows the components to telescope with respect to one another and absorb and damp forces transmitted thereto. Shrink piston 130 may be configured to receive strut piston 120 in a manner that allows the two components to telescope with respect to one another and absorb and damp forces transmitted thereto. Shrink piston 130 may be slidably reciprocable within strut cylinder 110. Strut piston 120 may be slidably reciprocable within shrink piston 130.

In various embodiments, shock strut 30 may include an upper torque link arm 112 and a lower torque link arm 114. Upper torque link arm 112 may be pivotally coupled to strut cylinder 110. Upper torque link arm 112 may be pivotally coupled to lower torque link arm 114. Lower torque link arm 114 may be pivotally coupled to strut piston 120. Shrink piston 130 may extend from strut cylinder 110 by a dimension (also referred to herein as a shrink stroke) 132. Strut piston 120 may extend from shrink piston 130 by a dimension (also referred to herein as a strut stroke) 122. In various embodiments, the total stroke of shock strut 30 (e.g., for landing and/or taxiing) may be dimension 122. In various embodiments, the total stroke of shock strut 30 (e.g., for landing and/or taxiing) may be a combination of dimension 122 and dimension 132. The total stroke of shock strut 30 (e.g., for landing and/or taxiing) may be determined by the design of shock strut 30.

Figure 2B:
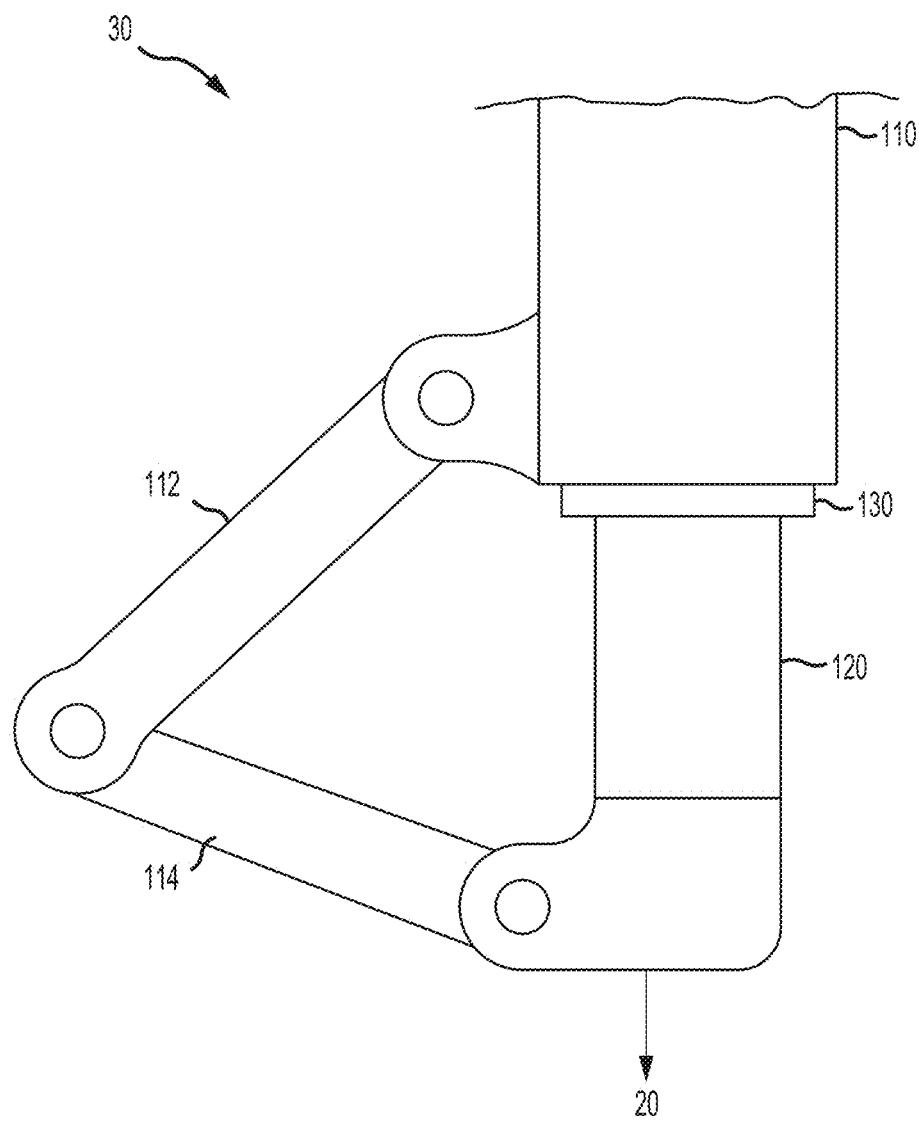
FIG. 2B illustrates a shock strut in a shrunk position, in accordance with various embodiments.

With reference to FIG. 2B, shock strut 30 is illustrated in a shrunk position, in accordance with various embodiments. With combined reference to FIG. 2A and FIG. 2B, dimension 132 may be zero in response to shock strut 30 being in the shrunk position.

Figure 3A:
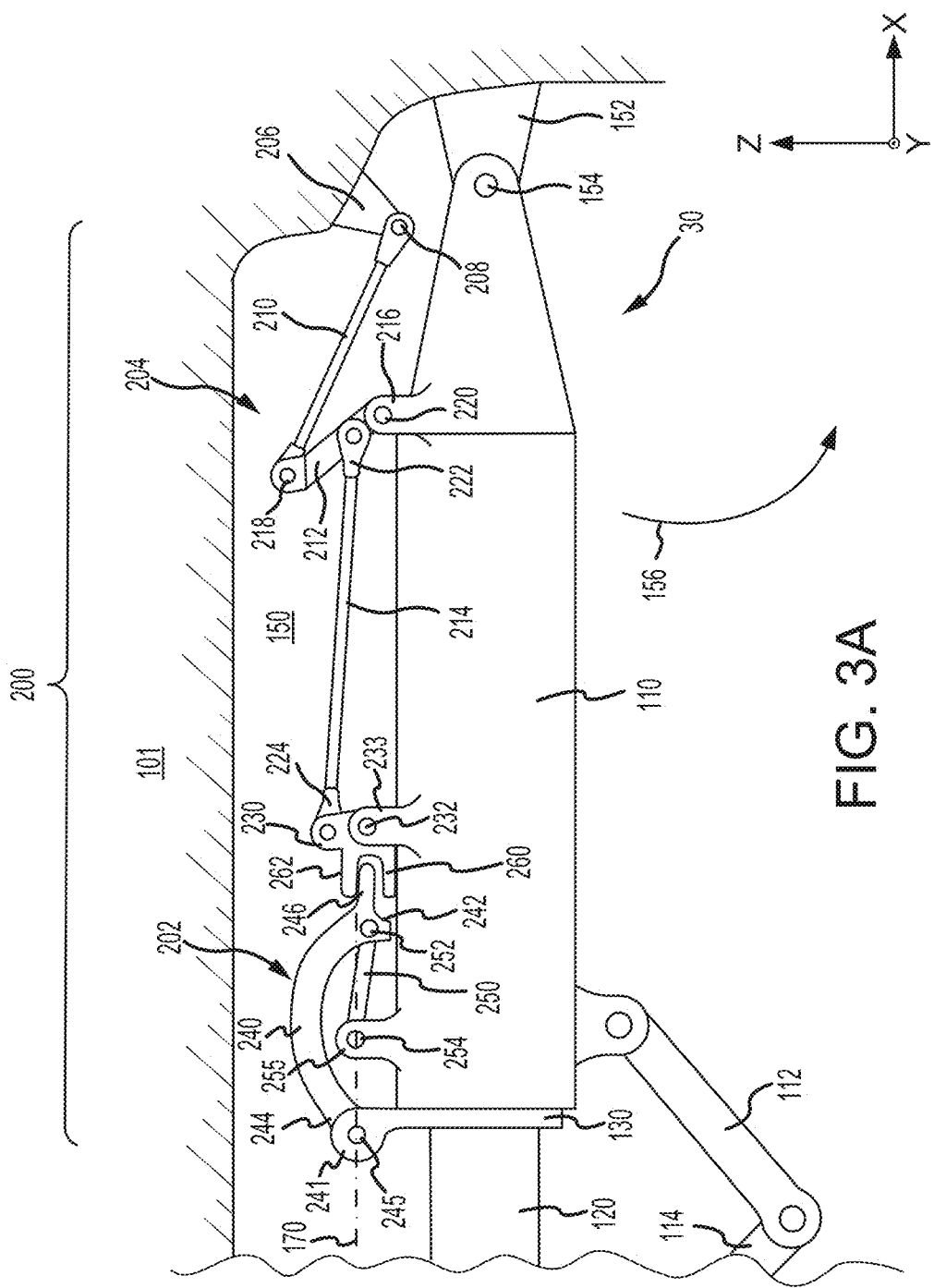
FIG. 3A illustrates a shock strut in a landing gear up position and having a latch assembly in a locked, over-center position, with the shock strut shrunk and a first linkage of the latch assembly being blocked from translating to an in-line position, accordance with various embodiments.

With reference to FIG. 3A, shock strut 30 is illustrated in a landing gear up position with shock strut 30 in the shrunk position, in accordance with various embodiments. In the landing gear up position, shock strut 30 and wheel assembly 20 (FIG. 1) may be located within a wheel well 150 of aircraft 10.

Figure 3B:
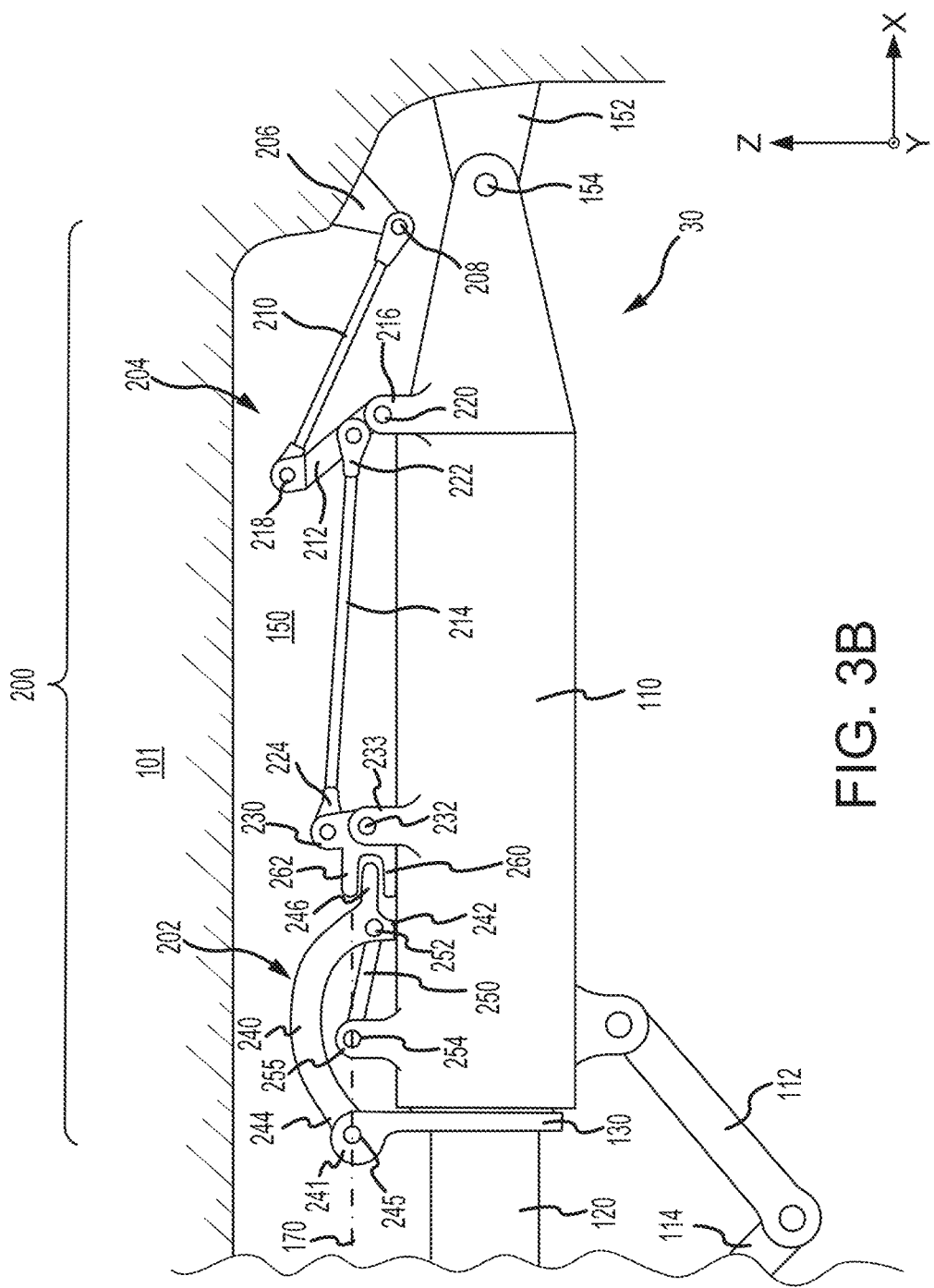
FIG. 3B illustrates a shock strut in a landing gear up position and having a latch assembly in a locked, over-center position, with the shock strut shrunk and a first linkage of the latch assembly contacting the strut cylinder to prevent the strut from unshrinking, in accordance with various embodiments.
Figure 3C:
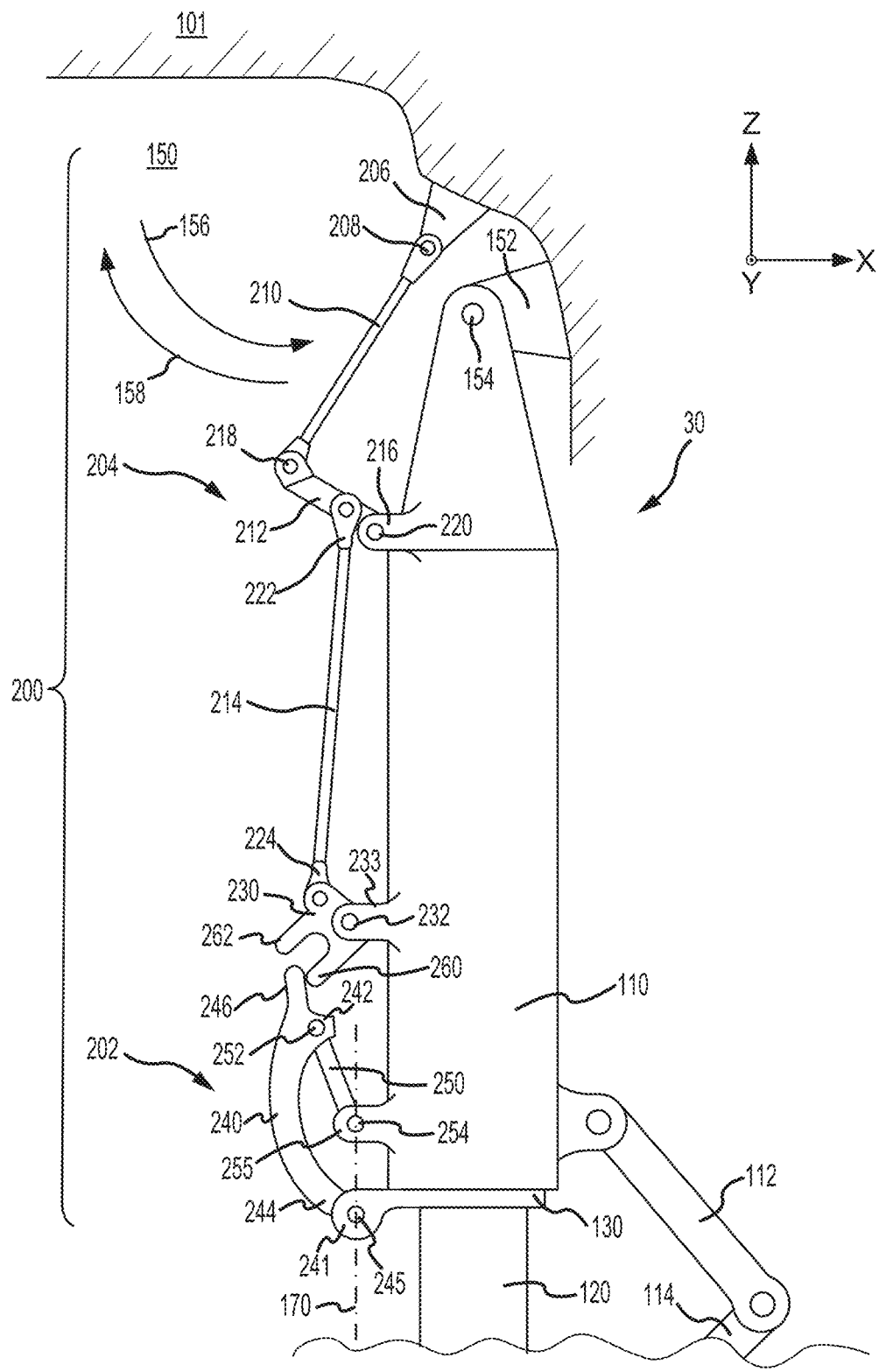
FIG. 3C illustrates a shock strut in the landing gear down position and having a latch assembly in an unlocked, under-center position, with the shock strut shrunk and a first linkage of the latch assembly being blocked from translating to an in-line position, in accordance with various embodiments.

With reference to FIG. 3C, shock strut 30 is illustrated in a landing gear down position with shock strut 30 in the shrunk position, in accordance with various embodiments. In the landing gear down position, shock strut 30 and wheel assembly 20 (FIG. 1) may be located outside wheel well 150.

Figure 3D:
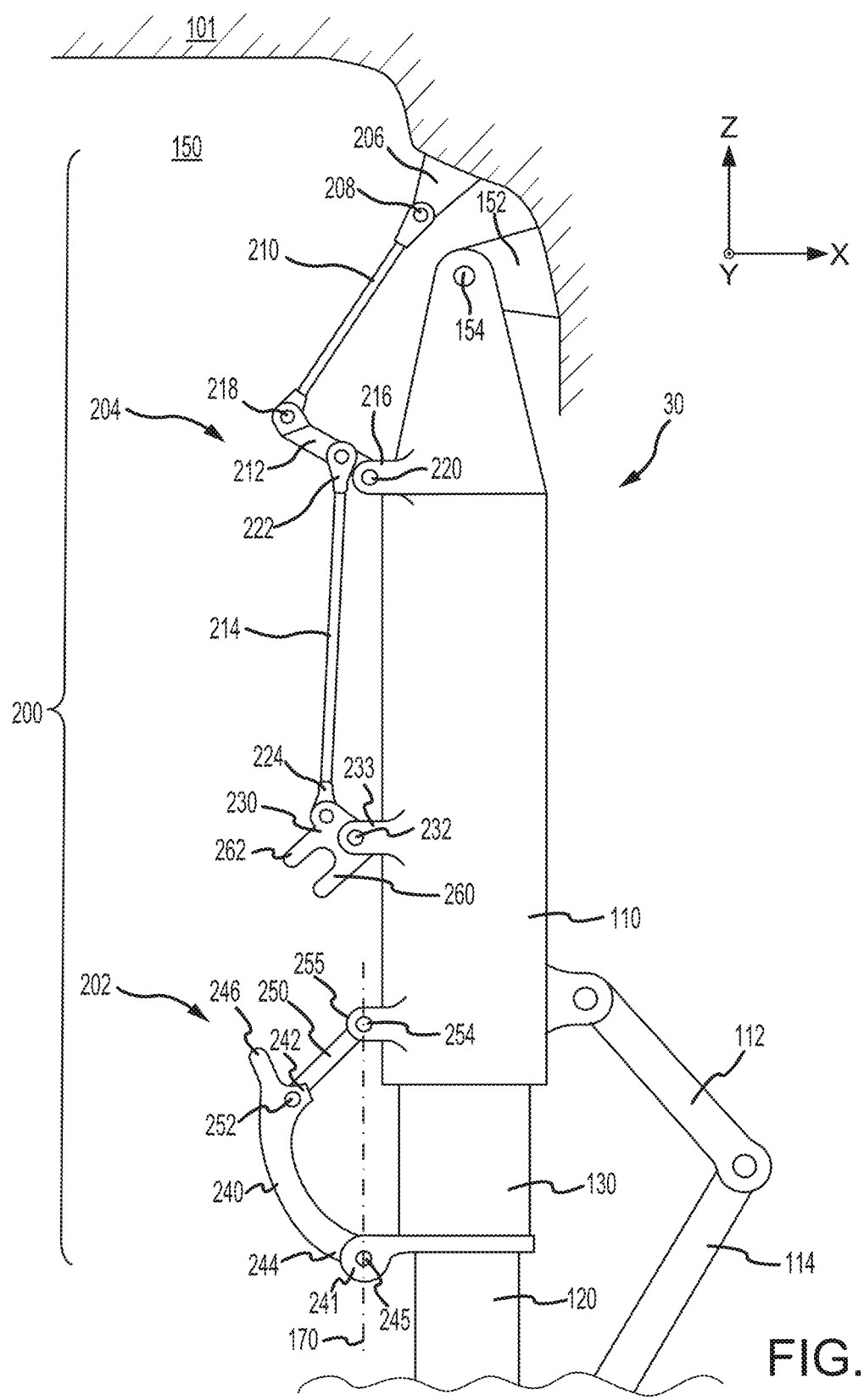
FIG. 3D illustrates a shock strut in the landing gear down position with the shock strut unshrunk and the latch assembly in the unlocked, under-center position, in accordance with various embodiments.

With combined reference to FIGS. 3A, 3B, 3C, and 3D, in various embodiments, shock strut 30 is pivotally coupled to a static structure 101. In various embodiments, static structure 101 may be a portion of fuselage 11 or a portion of wings 13, with momentary reference to FIG. 1. Shock strut 30 is configured to rotate relative to static structure 101. In various embodiments, shock strut 30 is pivotally coupled to a flange 152 of static structure 101 via a pivot joint 154. Pivot joint 154 may be configured to allow shock strut 30 to rotate between the landing gear up position (FIGS. 3A and 3B) and the landing gear down position (FIGS. 3C and 3D). Stated differently, shock strut 30 may rotate about pivot joint 154 in the direction of arrow 156 (FIG. 3A), thereby causing shock strut 30 and wheel assembly 20 (FIG. 1) to translate out wheel well 150 and into the landing gear down position. Shock strut 30 may also rotate about pivot joint 154 in the direction of arrow 158 (FIG. 3C), thereby causing shock strut 30 and wheel assembly 20 (FIG. 1) to translate into wheel well 150 and into the landing gear up position.

Shock strut 30 includes a latch assembly 200. In various embodiments, latch assembly 200 may be coupled between strut cylinder 110 and shrink piston 130. Latch assembly 200 may be configured to regulate translation of shrink piston 130 relative to strut cylinder 110. In this regard, latch assembly 200 may be configured to prevent shrink piston 130 from translating away from strut cylinder 110, when shock strut 30 is the landing gear up position, and to allow shrink piston 130 to translate away from strut cylinder 110, when shock strut 30 is the landing gear down position. For example, in various embodiments, a liquid, such as a hydraulic fluid and/or oil, may be located within strut cylinder 110. Shrink piston 130 may compress into strut cylinder 110 in response to the hydraulic fluid pressure being above a predetermined threshold. In operation, the hydraulic fluid pressure may be maintained above the predetermined threshold, while shock strut 30 is in the landing gear up position. In the event of a hydraulic fluid leak, latch assembly 200 may maintain shock strut 30 in the shrunk position, while in the landing gear up position. Stated differently, should the hydraulic fluid pressure drop below the threshold necessary to maintain shock strut 30 in the shrunk position, latch assembly 200 may prevent shrink piston 130 and/or strut piston 120 from unshrinking (i.e., translating out of strut cylinder 110), while shock strut 30 is within wheel well 150.

Latch assembly 200 may comprise a first linkage 202 and a second linkage 204. First linkage 202 may be coupled to and may extend between strut cylinder 110 and shrink piston 130. Second linkage 204 may be coupled to strut cylinder 110 and may extend between strut cylinder 110 and static structure 101 (e.g., fuselage 11 or wing 13 of FIG. 1). Second linkage 204 may be configured to manipulate first linkage 202 to regulate translation (i.e., shrinking and unshrinking) of shrink piston 130 relative to strut cylinder 110. In various embodiments, second linkage 204 may include a clevis 230, and first linkage 202 may include a tang 246. Second linkage 204 may be configured to rotate clevis 230 in response to rotation of strut cylinder 110 about pivot joint 154. Stated differently, second linkage 204 may be configured to rotate clevis 230 in response to shock strut 30 rotating between the landing gear up and landing gear down positions. Clevis 230 may be configured to engage tang 246 and thereby translate first linkage 202 between a locked, over-center position (FIGS. 3A and 3B), which prevents shock strut 30 from unshrinking, and an unlocked, under-center position (FIGS. 3C and 3D) which allows shock strut 30 to unshrink.

In various embodiments, second linkage 204 may comprise links or struts 210, 212, and 214. Strut 210 may be coupled to a flange 206 of static structure 101 via a pivot joint 208. As shock strut 30 rotates between the landing gear up and landing gear down positions, pivot joint 208 may allow strut 210 to rotate relative to flange 206 and static structure 101. Strut 212 may be pivotally coupled to strut 210 and a flange 216 of strut cylinder 110. For example, a first end of strut 212 may be coupled to strut 210 via a pivot joint 218 and a second end of strut 212, opposite the first end of strut 212, may be coupled to flange 216 via a pivot joint 220. Pivot joint 218 may allow struts 210 and 212 to rotate relative to one another. Pivot joint 220 may allow strut 212 to rotate relative to flange 216 and strut cylinder 110.

A first end 222 of strut 214 may be coupled to strut 212. In various embodiments, first end 222 may be coupled to strut 212 between pivot joint 218 and pivot joint 220. A second end 224 of strut 214 may be coupled to clevis 230. Clevis 230 may comprise a generally U-shaped structure having an inboard arm or lug 260 proximate strut cylinder 110 and an outboard arm or lug 262 distal strut cylinder 110. Clevis 230 may be pivotally coupled to a flange 233 of strut cylinder 110 via a pivot joint 232. Pivot joint 232 may allow clevis 230 to rotate relative to flange 233 and strut cylinder 110. Stated differently, clevis 230 may rotate about pivot joint 232. For example, in various embodiments, shock strut 30 rotating in the direction of arrow 156 (i.e., from the landing up position to the landing gear down position) may cause an actuation of struts 210, 212, and 214, which causes clevis 230 to rotate about pivot joint 232 in a first direction away from strut cylinder 110. In various embodiments, shock strut 30 rotating in the direction of arrow 158 (i.e., from the landing down position to the landing gear up position) causes an actuation of struts 210, 212, and 214, which causes clevis 230 to rotate about pivot joint 232 in a second direction toward strut cylinder 110.

In various embodiments, first linkage 202 may comprise links or struts 240 and 250. Strut 240 has a first end 242 and a second end 244 generally opposite the first end 242. First end 242 of strut 240 may be pivotally coupled to strut 250 via a pivot joint 252. Pivot joint 252 may be configured to allow struts 240 and 250 to rotate relative to one another during translation of shrink piston 130. A protrusion or tang 246 may extend (i.e., protrude) from first end 242 of strut 240. Second end 244 of strut 240 may be coupled to a flange 241 of shrink piston 130 via a pivot joint 245. Strut 250 may be pivotally coupled to a flange 255 of strut cylinder 110 via a pivot joint 254. Pivot joint 254 may be configured to allow strut 250 to rotate relative to flange 255 and strut cylinder 110.

Second linkage 204 may be configured to manipulate first linkage 202. For example, clevis 230 may be configured to engage and translate tang 246. In various embodiments, in the landing gear up position, tang 246 may be located between inboard lug 260 and outboard lug 262 of clevis 230. In the landing gear up position as shown in FIG. 3A, outboard lug 262 may prevent tang 246 from translating away from strut cylinder 110, thereby blocking first linkage from translating to an "in-line" position. As used herein, "in-line position" refers to a positioning of first linkage 202 where the axis of rotation of pivot joint 252 is located on a center line 170, wherein center line 170 is an imaginary line extending through the axis of rotation of pivot joint 254 and the axis of rotation of pivot joint 245. Tang 246 contacting outboard lug 262 may also prevents shrink piston 130 from unshrinking. It is further contemplated and understood that tang 246 may be switched with clevis 230, such that second linkage 204 includes a tang configured to rotate about pivot joint 232, and first linkage 202 includes a clevis extending from first end 242 of strut 240. In this regard, second linkage 204 may be configured to rotate the tang in response to rotation of strut cylinder 110 about pivot joint 154, such that the tang of second linkage 204 engages the clevis of first linkage 202 and translates first linkage 202 between the locked, over-center position and the unlocked, under-center position.

In various embodiments, and with reference to FIG. 3B, first linkage 202 may also be configured such that in the locked, over-center position, the first end 242 of strut 240 will contact strut cylinder 110 to prevent shrink piston 130 from unshrinking. For example, in the event of a hydraulic fluid leak or other failure, shock strut 30 may attempt to unshrink. Translation of shrink piston 130 away from strut cylinder causes first end 242 of strut 240 to translate toward strut cylinder 110. Upon first end 242 of strut 240 contacting strut cylinder 110, further translation, or unshrinking, of shrink piston 130 is prevented.

FIGS. 3A and 3B, show latch assembly 200 in a locked, over-center position. In various embodiments, latch assembly 200 may be in the locked, over-center position when shock strut 30 is in the landing gear up position. For example, as shock strut 30 translates from the landing gear down position to the landing gear up position, clevis 230 may engage tang 246 and translate first linkage 202 to the over-center position. In the locked, over-center position, pivot joint 252 is located over center line 170. As used herein, "over-center position" refers to a positioning of first linkage 202 wherein pivot joint 252 is located between center line 170 and strut cylinder 110 (i.e., the distance between pivot joint 252 and strut cylinder 110 is less than the distance between center line 170 and strut cylinder 110). Clevis 230 and second linkage 204 are configured such that, in the over-center position, outboard lug 262 blocks or otherwise prevents first linkage 202 from being in the in-line position.

With reference to FIG. 3C, as shock strut 30 rotates to the landing gear down position (i.e., as strut cylinder 110 rotates about pivot joint 154 in the direction of arrow 156), actuation of struts 210, 212, and 214 may cause clevis 230 to rotate about pivot joint 232, thereby removing outboard lug 262 from the path of tang 246 and causing inboard lug 260 to contact tang 246. As clevis 230 continues to rotate about pivot joint 232, the contact between inboard lug 260 and tang 246 forces tang 246 to translate away from strut cylinder 110 and into an unlocked, under-center position. In the unlocked, under-center position, pivot joint 252 is located under center line 170. As used herein, "under-center position" refers to a position of first linkage 202, wherein center line 170 is located between pivot joint 252 and strut cylinder 110 (i.e., the distance between pivot joint 252 and strut cylinder 110 is greater than the distance between center line 170 and strut cylinder 110). First linkage 202 being in the under-center position may allow shrink piston 130 to translate more freely. Stated differently, when first linkage 202 is in the under-center position, the positioning of inboard lug 260 of clevis 230 may prevent (i.e., block) first linkage 202 from translating to the in-line position. Preventing first linkage 202 from being in the in-line position tends to prevent first linkage 202 from jamming or otherwise unintentionally preventing shock strut 30 from shrinking and/or unshrinking.

FIG. 3D illustrates shrink piston 130 in a fully unshrunk position, in accordance with various embodiments. With outboard lug 262 removed from the path of tang 246, struts 240 and 250 are free to rotate about pivot joints 252, 245, and 254, which allows shrink piston 130 to translate away from strut cylinder 110. Stated differently, as shrink piston 130 translates away from strut cylinder 110, pivot joint 245 and second end 244 of strut 240 move in the negative Z-direction, thereby causing strut 250 to pivot about pivot joint 254 and first end 242 of strut 240 to pivot about pivot joint 252. With combined reference to FIGS. 1 and 3D, second linkage 204 may be configured to rotate clevis 230, after wheel assembly 20 exits wheel well 150. Stated differently, struts 210, 212, and 214 and/or pivot joints 208, 218, 220, and 232 may be configured such that outboard lug 262 remains in the path of tang 246 (FIG. 3A) and strut cylinder 110 remains in the path of first end 242 (FIG. 3B), until wheel assembly 20 is located outside of wheel well.

Referring to FIGS. 1, 3A, and 3C, when landing gear 12 moves to the landing gear down position with shock strut 30 in the shrunk condition, the motion of clevis 230, as driven by rotation of second linkage 204 and via contact with tang 246 of first linkage 202, moves first linkage 202 from an over-center position to an under-center position. Once in the landing gear down position, clevis 230 impedes any attempt by first linkage 202 to reach an in-line position (i.e., to reach a position where the axis of pivot joint 252 is located on center line 170). Once in the under-center position, any attempt to unshrink shock strut 30 should be successful. The timing of clevis 230 moving first linkage 202 from an over-center position to an under-center position is such that the wheels and tires of landing gear 12 are clear of any obstruction in wheel well 150 that might prevent shock strut 30 from reaching the fully extended (i.e., unshrunk) position.

When landing gear 12 moves to the landing gear up position with shock strut 30 in the shrunk position, the motion of clevis 230 (as driven by second linkage 204), via contact with tang 246, moves first linkage 202 from an under-center position to an over-center position and impedes any attempt by first linkage 202 to reach the in-line position. Once in the over-center position, any attempt to unshrink shock strut 30 will drive first linkage (e.g., first end 242 of strut 240) into strut cylinder 110, thereby preventing shock strut 30 from unshrinking. The timing of clevis 230 moving first linkage 202 from an under-center position to an over-center position may be such that shock strut 30 is shrunk and first linkage 202 is in an over-center position prior to any obstruction in wheel well 150 contacting the wheels and tires of landing gear 12.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A latch assembly for a shock strut, comprising:
   a first linkage coupled to a strut cylinder and to a shrink piston of the shock strut, the first linkage comprising a tang; and
   a second linkage coupled to the strut cylinder, the second linkage comprising a clevis configured to engage the tang, wherein the second linkage is configured to rotate the clevis in response to the shock strut translating between a landing gear up position and a landing gear down position, and wherein the clevis is configured to block the first linkage from being in an in-line position.

2. The latch assembly of claim 1, wherein the clevis is configured to rotate in a first direction and translate the tang away from the strut cylinder, and wherein the tang is configured such that translation of the tang away from the strut cylinder translates the first linkage to an under-center position.

3. The latch assembly of claim 2, wherein the clevis is further configured to rotate in a second direction opposite the first direction and translate the tang toward the strut cylinder, and wherein the tang is configured such that translation of the tang toward the strut cylinder translates the first linkage to an over-center position.

4. The latch assembly of claim 1, wherein the clevis comprises an inboard lug proximate the strut cylinder and an outboard lug distal the strut cylinder.

5. The latch assembly of claim 4, wherein the outboard lug is configured to limit a translation of the tang when the latch assembly is in a locked position.

6. The latch assembly of claim 5, wherein the inboard lug is configured to limit translation of the tang toward the strut cylinder when the latch assembly is in an unlocked position.

7. The latch assembly of claim 1, wherein the clevis is configured such that as the shock strut moves from the landing gear up position to the landing gear down position the clevis engages the tang and translates the first linkage from an over-center position to an under-center position.

8. The shock strut of claim 7, wherein the clevis is configured such that as the shock strut moves from the landing gear down position to the landing gear up position the clevis engages the tang and translates the first linkage from the under-center position to the over-center position.

9. A shock strut, comprising:
   a strut cylinder configured to rotate about a pivot joint;
   a shrink piston operatively coupled to the strut cylinder; and
   a latch assembly configured to regulate translation of the shrink piston, the latch assembly comprising:

a first linkage coupled to the shrink piston, and a second linkage configured to manipulate the first linkage, wherein the second linkage is configured to rotate the first linkage in response to a rotation of the strut cylinder about the pivot joint, and wherein the second linkage is configured to block the first linkage from being in an in-line position, and wherein at least one of the first linkage or the second linkage comprises a clevis, the clevis being configured to rotate in a first direction and translate the first linkage to an under-center position, and wherein the shrink piston is able to unshrink when the first linkage is in the under-center position.

10. The shock strut of claim 9, wherein the first linkage comprises a tang, and the second linkage comprises the clevis, and wherein the clevis is configured such that as the shock strut translates from a landing gear up position to a landing gear down position the clevis engages the tang and translates the first linkage from an over-center position to the under-center position.

11. The shock strut of claim 10, wherein the clevis is configured such that as the shock strut translates from the landing gear down position to the landing gear up position the clevis engages the tang and translates the first linkage from the under-center position to the over-center position.

12. The shock strut of claim 11, wherein the first linkage is configured such that in the over-center position the shrink piston is prevented from translating away from the strut cylinder.

13. The shock strut of claim 12, wherein the first linkage and the second linkage are configured such that when the first linkage is in the under-center position an inboard lug of the clevis prevents the first linkage from translating to the in-line position.

14. The shock strut of claim 9, wherein the clevis is configured to rotate in a second direction opposite the first direction and translate the first linkage to an over-center position, and wherein the shrink piston is prevented from unshrinking when the first linkage is in the over-center position.

15. A shock strut, comprising:
a strut cylinder;
a shrink piston operatively coupled to the strut cylinder; and
a latch assembly configured to regulate translation of the shrink piston relative to the strut cylinder, the latch assembly comprising:
a first linkage coupled to the strut cylinder and the shrink piston, the first linkage comprising a tang; and
a second linkage coupled to the strut cylinder, the second linkage comprising a clevis, wherein the second linkage is configured to rotate the clevis in response to a rotation of the strut cylinder, and wherein the second linkage is configured to translate the first linkage between an over-center position and an under-center position as the shock strut rotates between a landing gear up position and a landing gear down position.

16. The shock strut of claim 15 wherein the second linkage is configured to rotate the clevis in a first direction and translate the tang away from the strut cylinder, and wherein the clevis and the tang are configured such that rotation of the clevis in the first direction forces the first linkage into the under-center position.

17. The shock strut of claim 16, wherein the second linkage is configured to rotate the clevis in a second direction opposite the first direction and translate the tang toward the strut cylinder, and wherein the clevis and the tang are configured such that rotation of the clevis in the second direction forces the first linkage into the over-center position.

18. The shock strut of claim 15, wherein when the first linkage is in the over-center position the shrink piston is prevented from translating away from the strut cylinder.

* * * * *